July 7, 1936. H. H. STOUT ET AL 2,046,753
ROASTING APPARATUS
Original Filed May 29, 1923
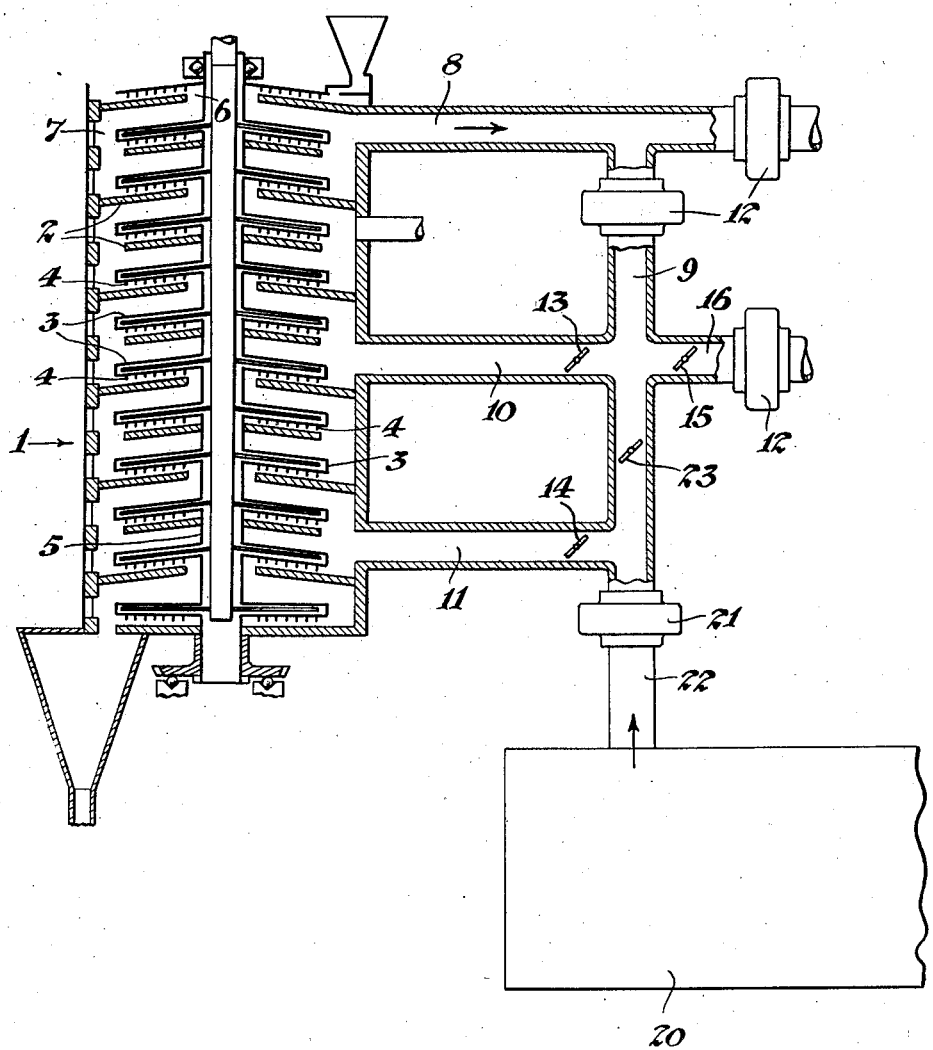
Harry H. Stout
John M. Samuel
Inventor
By their Attorney
Frank H. Kent Patented July 7, 1936

2,046,753

UNITED STATES PATENT OFFICE 2,046,753

ROASTING APPARATUS

Harry H. Stout, Clifton, and John M. Samuel, Douglas, Ariz.

Application May 29, 1928, Serial No. 281,382
Renewed May 7, 1932

4 Claims. (Cl. 75—60)

Our invention relates to methods of and apparatus for roasting metallurgical products containing sulphides, these being usually definable broadly as ores or ore mixtures, including those containing sulphide minerals and water. The invention is therefore applicable to treatment of various metallic ores or furnace products (such for example as leady mattes); but it has been developed with especial reference to the treatment of copper-sulphide ores or concentrates, and from the description of its application for this purpose its characteristics, objects and advantages will be understood by persons skilled in this art.

The general object is to increase the efficiency and intensity of the roasting process, and to conserve heat within permissible limits, so as to greatly increase the unit charge, with increased sulphur elimination, (or production of low-sulphur calcines) and with relatively high calcine heat.

A more particular object is to attain these results with charges of low unit net heat and with a self-sustaining roast (i. e., without extraneous heat derived from fuel burned for the purpose of maintaining the roast).

Another object is to reduce plant and operating cost by providing roasters of high capacity in proportion to horizontal area, and by circulating the concentrate more rapidly, or in larger volume, through them.

These and other objects are attained, as to the apparatus, by providing a substantially increased number of hearths, so constructing or operating the rabble arms as to properly "handle" or advance a greatly increased unit charge, providing gas-ports of substantially increased total area, and providing means for supplying and utilizing hot gases in such manner as to increase oxidation and thermal efficiency; and as to the process, by feeding a greatly increased unit charge, crushing the charge (or concentrate) to (usually) relatively greater fineness than heretofore, the degree of comminution being determined with reference to other conditions, moving the charge through a relatively longer course in the roaster, and relatively more rapidly, supplying usually a reduced total volume of air, but passing air and gases through the roaster with greater rapidity and in more effective contact with the charge, whereby oxidation is enhanced, supplying hot gases from upper parts of the roaster to lower parts, with or without additional air, and sometimes supplying hot converter discharge gas to the roaster. Some or all of the stated devices, features, or process steps may be employed, depending on varying conditions.

The characteristics and advantages of the invention are further sufficiently explained in connection with the following detail description of the accompanying drawing, which shows one preferred embodiment. After considering this example, skilled persons will understand that many variations may be made, and we contemplate the employment of any structures that are properly within the scope of the appended claims.

The drawing is a diagrammatic view of apparatus embodying the invention in one form.

Following are definitions of some of the more important technical words or terms as used herein:

*Roaster.*—Any suitable type, but preferably, of the type of the multiple-hearth roaster well known in the art. By "roaster of the rotary rabble arm type" is meant a roaster having a number of circular, super-imposed hearths surrounded by a vertically disposed cylindrical shell, a shaft extending vertically through the hearths, the shaft carrying rabble arms which are rotated by the shaft.

*Charge.*—Metallurgical products containing sulphides, and especially ores and ore mixtures including those containing sulphide minerals and water, which are fed into the upper portion of the roaster.

*Unit charge.*—Tons of 2,000 lbs. of dry charge which one roaster will roast in 24 hours.

*Sulphur elimination.*—The sulphur removed from the charge and passing out of the roaster in the exit gases.

*Calcines.*—The regulatably roasted product of the roaster.

*Calcine sulphur.*—Per cent of sulphur in the calcines.

*Ports.*—The openings in each hearth, through which the gases ascend and the charge descends.

*Port area.*—The total square foot area of all the ports of one hearth.

*Port velocity.*—The velocity of the gases, in feet per second, passing through the ports, calculated at gas conditions in each port.

*Net heat.*—The total sensible heat entering the roaster in the charge and in the oxidizing air and/or gas plus the heat generated by all the reactions between the charge and the air and/or gas, minus the heat absorbed by all dissociation and evaporation.

*Unit net heat.*—Net heat per ton of charge.

*Exit gas heat.*—The sensible and latent heat which escapes from the roaster in the exit gases.

*Calcine heat.*—The sensible heat which escapes from the roaster in the calcines.

*Dissipated heat.*—The sensible heat escaping from the outside surfaces of the roaster by radiation, convection and conduction.

*Concentrates.*—The product of the mills when low grade ores are concentrated; they are relatively finely ground, and, hence, are not suited to smelting in a blast furnace. Their uncombined water content is relatively high. In the case of copper concentrates, under average modern conditions, their copper content is usually relatively high with reference to the sulphur content, which necessitates relatively high calcine sulphur in order to produce, in smelting, the required grade of copper matte. Their unit net heat is relatively low.

*Self sustaining roast.*—One in which extraneous fuel is not used except in starting the roast.

The invention was developed by study and experiment prompted largely by changing conditions in the smelting industry, and a brief explanation of older and more recent conditions and practices is therefore first given, followed by a general statement of our discoveries and determinations based thereon, and finally a description of representative apparatus and methods embodying the invention.

Commencing about 1910, the relative amounts of concentrates received by smelters in this country began to increase, due to the practical development of the mining and milling of low grade porphyry ores, and this caused a decrease in the use of blast furnaces, with a corresponding increase in reverberatory smelting. Generally these early concentrates had relatively high unit net heat, but because of inefficient utilization of oxygen in the air supplied to the roasters, the unit charge was small and the calcine temperature low. This resulted in high roasting costs and also high reverberatory furnace cost (due to low temperature calcine); and consequently the reverberatory smelting cost was higher than that of blast furnace smelting. Gradual improvement in concentrating metallurgy resulted in higher copper content concentrates (with consequent lower ratio sulphur to copper) and of high uncombined water content; the unit net heat of the concentrates has gradually but progressively decreased until the problem of obtaining a self-sustaining roast, with high temperature calcines, became very difficult.

Our investigation disclosed that roasting the high unit net heat charges of previous years resulted in about the following conditions in the roaster: exit gas about 400° F. containing from 2.5% to 4.0% sulphur dioxide (by dry volume); unit charge about 70 tons when roasting a charge of about 26.0% sulphur; 4.0% uncombined water to a calcine sulphur of 12; the resulting calcine temperature about 800° F. The upper portions of the furnace were occupied in evaporating the water and heating the charge to a temperature where oxidation (roasting) began and a relatively small portion of the total hearth area was performing the roasting operation. Our investigation also disclosed that with the gradual decline of the unit net heat of the charge, extraneous fuel was resorted to, which did not improve either the amount of unit charge or the calcine temperature, but on the other hand materially increased the cost of the roasting operation.

It was known in the art that the quantity of air which was put through a roaster to supply oxygen for the oxidation of the sulphides was limited by a maximum port velocity beyond which the gas current would carry incandescent particles of the charge upward and cause them to agglomerate on the under side of the next-upper hearth.

The continual barring and removal of these agglomerated accretions caused lost time and consequently the maximum unit charge was limited to the amount which could be roasted by that quantity of air which could pass through the ports at the maximum port velocity below that which would cause undue amounts of accretions. This maximum port velocity we found to be about 7 feet per second.

Our investigation also disclosed that the net heat escaped from roasters through the following channels:

(1) In calcine heat;
(2) In exit gas heat;
(3) In top dry heat;
(4) In dissipated heat;

of which the first two items are relatively large compared to the last two.

As a fair example of the low net heat charges more recently used, and handled in the most efficient manner known previous to this invention, as briefly outlined above, there was approximately 8120 lbs. of exit gas per ton of charge and 1760 lbs. calcines per ton; this total of 9880 lbs. of materials per ton of charge carried off from the roaster the major portion of the heat.

Our study and experimentation were based on the above conditions or ascertainments, and were directed along the general lines stated early above, resulting in the present improved and efficient process (and apparatus for effecting it) including the following principal steps, not all of which are essential in every case, as will be understood by skilled persons: The feeding to a roaster of proper design (as sufficiently detailed hereafter) of a greatly increased unit charge, the roaster being designed to properly contain and advance this larger amount of material contained therein at any given time; advancing the material relatively-rapidly, so that it remains in the roaster for a shorter time than in previous practice; preferably crushing the charge prior to feeding into the roaster to a suitable fineness, usually substantially finer than in previous practice, the degree of comminution depending largely upon the character of the minerals composing the charge and the desired calcine sulphur content; supplying or circulating the desired total amount of air in effect more rapidly through the roaster, although within the limit of port velocity at which the movement of incandescent particles of the charge (with due regard to the fineness of the particles) and agglomeration, would occur, as above referred to; in some cases withdrawing from upper portions of the roaster regulatable amounts of hot gases containing sulphur dioxide and introducing them at suitable points in the lower portion of the roaster, with or without regulatable amounts of air (this step or operation causing at the same time a decrease in temperature of the exit gases); and in some cases, and especially if the previous steps or operations will not with the particular concentrate and with the highest practical sulphur dioxide exit gas content, maintain a self-sustaining roast at the desired high unit charge rate, the roast is made self-sustaining by admitting regulatable amounts of hot exit gases from a converter, such gases containing sulphur dioxide, at suitable points in the roaster, together with regulatable amounts of air at suitable points. It is here remarked without necessity for further reference, that the introduction of hot gases containing sulphur dioxide into lower portions of the roaster increases the relative temperature of the lower hearth which in turn lowers the calcine sulphur in a roaster of the type called a "dead roaster", as in roasting pyrites, pyrrhotite, zinc blende, etc. in the manufacture of sulphuric acid, or where the calcines are subsequently used for purposes requiring low calcine sulphur.

The important novel and advantageous results obtained depend largely on our discovery and demonstration that if more of the oxygen in the entering air could be properly utilized, and the exit gases caused to escape with a higher sulphur dioxide content (say approximately 8.0%), the weight of the exit gases would be about 3680 lbs. instead of 8120 lbs. as referred to in the previously given example of prior art practice, and the combined weight of the calcines plus exit gas would be about 5440 lbs. per ton of charge instead of 9880 lbs. as formerly; and since the net heat per ton would be the same the exit gas and calcines would have correspondingly higher temperatures.

As one particular example of the process operation or results, on the basis of data items of the character just given, we have, when operating with lower unit net heat charges than formerly, with the same diameter roaster but eleven hearths instead of six, revolving the rabble arms at increased speed, using suitable pitch rabble teeth, and crushing the charge to suitable fineness, obtained 8% by volume sulphur dioxide exit gas at 750° F.; 340 tons unit charge, as against 70 in former practice, and a calcine temperature of 1200° F. as compared with 800° in former practice. These results have been and are obtained in our current practice without the use of extraneous fuel.

We have also demonstrated that the roaster and the process are capable of utilizing the lowest unit net heat ores received at any smelter so far as known, and roasting the concentrates at the desired high unit charge rate without the use of extraneous fuel; and if the unit net heat of the ores received increases, due to mine or mill changes, the temperatures of the roaster can be prevented from rising to the sintering point by the removal of heat by any of the methods now used in the art; such regulation is sufficient to cover the usual normal changes in composition of the charge received at the smelters.

Our method as briefly recapitulated, has the following advantages over the best known prior art methods:

A. A substantial decrease in first cost of construction due to the smaller number of roasters required, with correspondingly less building space for housing them.

B. A substantial reduction in roaster operating cost per ton of charge, due to substantially higher unit charges with the same labor requirement per roaster.

C. Low unit net heat charges can be made self sustaining, thus saving cost of extraneous fuel.

D. A substantially higher calcine temperature can be obtained when roasting low net heat charges, which materially reduces the amount of fuel required in the subsequent reverberatory furnace melting.

E. Production of exit gases of high enough sulphur dioxide content for the manufacture of sulphuric acid without the necessity of reducing unit charges or production of high calcine sulphur.

F. The small floor space required by each unit, together with the high unit charge rate, makes it practical in reverberatory copper smelting, to superimpose a sufficient number of roasters over a modern reverberatory furnace to supply calcine for its maximum requirement, thereby obtaining a very substantial saving in combined roasting and reverberatory furnace cost.

G. The proper combination of the above mentioned requirements for the efficient and economical roasting of different materials for different purposes can be predetermined accurately.

The apparatus employed for carrying out the process, in one preferred form, comprises (as shown diagrammatically in the drawing) a roaster 1 which may be a typical rotary-rabble roaster, except for the invention improvements, as now specified. We provide a relatively-large number of superposed hearths 2, say eleven, in one preferred example, as compared with six, in ordinary practice. For each hearth there are the usual rabble arms 3, provided with blades 4, and carried by the central shaft 5. The shaft is rotated at relatively-high speed, or the blades are so positioned as to advance the charge-material at substantially higher speed; and the ports 6 and 7 are of total area to provide increased port-area, for reasons above given. Flues or conduits such as 8, 9, 10, 11 are provided, together with fans or blowers 12, and regulating dampers or valves 13, 14, 15, for taking any desired proportion of hot gases from upper parts of the roaster and supplying them regulably to lower parts, with additional air, when required, supplied through conduit 16. Hot gases containing sulphur dioxide from a converter 20 may be supplied to a lower part of the roaster (usually adjacent the lower hearth or hearths) for purposes above explained, by a blower 21 through a conduit 22, under control of valves 14 and 23.

By calculation from the data previously given, it will be seen that the following approximate values obtain:

*Prior art practice*

| | |
|---|---|
| Ore fed to the furnace per hour____tons__ | 2.92 |
| Exit gas per hour_____pounds__ | 23,710 |
| Exit gas per hour per percent of sulphur content of ore_____pounds__ | 912 |
| Exit gas per ton of ore per percent of sulphur content of ore_____pounds__ | 312 |

*Present invention*

| | |
|---|---|
| Ore fed to furnace per hour_____tons__ | 14.2 |
| Exit gas per hour_____pounds__ | 52,256 |
| Exit gas per hour per percent sulphur content of ore_____pounds__ | 2,010 |
| Exit gas per ton of ore per percent sulphur content of ore_____pounds__ | 142 |

We claim:

1. A roaster comprising at least eight superposed hearths, the hearths having large ports capable of passing sufficient air and gas, at a maximum port velocity of seven feet per second, to produce substantially more than 24,000 pounds of exit gas per hour, means for withdrawing gas containing sulphur dioxide from an upper portion of the roaster and supplying it to a lower portion thereof; and means for supplying from a separate source additional gas containing sulphur dioxide.

2. A roaster of the rotary rabble type comprising a relatively large number of superposed hearths, the hearths having large ports capable of passing sufficient air and gas at a maximum port velocity of seven feet per second, to produce substantially more than 24,000 pounds exit gas per hour; and means for supplying hot gas containing sulphur dioxide from a converter to the roaster.

3. A roaster of the rotary rabble type comprising a relatively large number of superposed hearths, the hearths having large ports capable of passing sufficient air and gas, at a maximum port velocity of seven feet per second, to produce substantially more than 24,000 pounds of exit gas per hour, means for supplying hot gas containing sulphur dioxide from a converter to the roaster; and means for supplying additional air to the roaster.

4. The process of roasting sulphurous copper ores having a unit net heat substantially less than one million seven hundred thousand (1,700,000) B. t. u., in a roaster of the rotary rabble arm type, which comprises crushing the ore to suitable fineness, feeding the ore to the furnace at the rate of approximately 340 tons in 24 hours, causing a current of air to move countercurrently to the ore, the amount of air, the length of the path over which the ore and air move countercurrently and the time of such movement, being arranged so as to utilize a larger proportion of the air than in prior art practice, and to cause a self-sustaining roast, producing approximately 3680 pounds of exit gas at approximately 750° F. and containing approximately 8% $SO_2$, and producing calcines at a temperature of approximately 1200° F. and suitable for subsequent treatment in a reverberatory furnace.

HARRY H. STOUT.
JOHN M. SAMUEL.